United States Patent [19]
Drobish

[11] Patent Number: 5,411,185
[45] Date of Patent: May 2, 1995

[54] SPRAY PUMP PACKAGE EMPLOYING MULTIPLE ORIFICES HAVING AN ORIFICE SELECTOR SYSTEM

[75] Inventor: James L. Drobish, Wyoming, Ohio

[73] Assignee: The Procter & Gamble Company, Cincinnati, Ohio

[21] Appl. No.: 252,613

[22] Filed: Jun. 1, 1994

Related U.S. Application Data

[63] Continuation of Ser. No. 96,636, Jul. 22, 1993, Pat. No. 5,337,926, which is a continuation of Ser. No. 832,526, Feb. 7, 1992, abandoned.

[51] Int. Cl.⁶ .............................................. B65D 83/06
[52] U.S. Cl. .................................................. 222/402.17
[58] Field of Search .................................. 222/41-43, 222/47, 50, 320, 321, 309, 383, 385, 402.17; 239/390, 393, 394, 397, 478, 579, 333; 137/555

[56] References Cited

U.S. PATENT DOCUMENTS

| Re. 28,366 | 3/1975 | Pechstein | 239/333 |
|---|---|---|---|
| 532,541 | 1/1895 | Dornfeld . | |
| 1,381,095 | 6/1921 | Starr . | |
| 1,416,424 | 5/1922 | Seymour, Jr. . | |
| 1,625,635 | 4/1927 | Willners . | |
| 1,701,218 | 2/1929 | Seaboldt . | |
| 1,966,911 | 7/1934 | Stephan | 299/107.6 |
| 2,112,548 | 3/1938 | Wilson | 221/147 |
| 2,415,194 | 2/1947 | Roselund | 91/45 |
| 2,483,951 | 10/1949 | Watson | 299/115 |
| 2,658,800 | 11/1953 | Collinson | 299/143 |
| 2,824,672 | 2/1958 | Wersching | 222/207 |
| 2,878,974 | 3/1959 | Dobkin | 222/321 |
| 2,997,243 | 8/1961 | Kolb | 222/402.17 X |
| 3,061,202 | 10/1962 | Tyler | 239/333 |
| 3,075,708 | 1/1963 | Cooprider | 239/490 |
| 3,083,872 | 4/1963 | Meshberg | 222/42 |
| 3,128,018 | 4/1964 | Corsette et al. | 222/321 |
| 3,146,920 | 9/1964 | Benjamin | 222/321 |
| 3,180,536 | 4/1965 | Meshberg | 222/394 |
| 3,187,960 | 6/1965 | Gorman | 222/321 |
| 3,188,008 | 6/1965 | Green | 222/402.17 X |
| 3,192,611 | 7/1965 | Briechle | 29/157 |
| 3,206,082 | 9/1965 | Green | 222/402.17 |
| 3,209,960 | 10/1965 | Green | 222/402.17 |
| 3,237,571 | 3/1966 | Corsette | 103/188 |
| 3,263,873 | 8/1966 | Armour | 239/394 X |
| 3,278,093 | 10/1966 | Lehmann | 222/402.17 |
| 3,298,573 | 1/1967 | Smalley | 222/207 |
| 3,342,382 | 9/1967 | Huling | 222/402.17 |
| 3,344,992 | 10/1967 | Norris | 239/8 |
| 3,394,889 | 7/1968 | Macquire-Cooper | 239/468 |
| 3,396,874 | 9/1968 | Malone | 222/402.1 |
| 3,409,184 | 11/1968 | Stengle, Jr. | 222/321 |
| 3,532,271 | 10/1970 | Polnauer | 239/1 |

(List continued on next page.)

FOREIGN PATENT DOCUMENTS 978910 12/1975 Canada .......................... 222/402.17
62-38766 of 0000 Japan .
760972 11/1956 United Kingdom .

Primary Examiner—Andres Kashnikow
Assistant Examiner—Kenneth R. DeRosa
Attorney, Agent, or Firm—Ronald W. Kock; Michael E. Hilton

[57] ABSTRACT

A spray orifice selector system for a spray package. The spray orifice selector, containing at least two spray orifices, is movably secured to a container housing a liquid. The selector provides fluid communication between the container and each of the spray orifices individually as the selector is moved from one detented position to another. A thumb wheel rotates the selector about a push button actuator connected to a spray pump. The spray pump is located between the selector and container. The push button does not rotate relative to the container, and it has a contoured shape which indicates the direction of spray to a user. Therefore, the user grips the pump the same way for each spray. The user may continue to grip the pump with one hand and select a different spray orifice by rotating the thumb wheel with the other hand, thereby avoiding the need to regrip the container when a different spray orifice is selected.

3 Claims, 10 Drawing Sheets

U.S. PATENT DOCUMENTS

| | | | |
|---|---|---|---|
| 3,533,558 | 10/1970 | Masters | 239/404 |
| 3,561,677 | 2/1971 | Norris et al. | 239/15 |
| 3,572,590 | 3/1971 | Malone | 239/327 |
| 3,642,180 | 2/1972 | Lehmann | 222/402.23 |
| 3,652,018 | 3/1972 | Focht | 239/490 |
| 3,703,994 | 11/1972 | Nigro | 222/402.17 X |
| 3,749,290 | 7/1973 | Micallef | 222/385 |
| 3,764,069 | 10/1973 | Runstadler, Jr. et al. | 239/8 |
| 3,771,728 | 11/1973 | Polnauer | 239/468 |
| 3,843,030 | 10/1974 | Micallef | 222/554 |
| 3,861,570 | 1/1975 | Green | 222/402.17 |
| 3,863,816 | 2/1975 | Focht | 222/402.17 |
| 3,995,776 | 12/1976 | Micallef | 222/207 |
| 4,025,046 | 5/1977 | Boris | 239/333 |
| 4,125,226 | 11/1978 | Nieukamp | 239/468 |
| 4,253,609 | 3/1981 | Laauwe | 239/327 |
| 4,260,110 | 4/1981 | Werding | 239/404 |
| 4,311,256 | 1/1982 | DeArmitt | 222/321 |
| 4,405,064 | 9/1983 | Stoody | 222/402.17 |
| 4,415,122 | 11/1983 | Laauwe | 239/327 |
| 4,433,799 | 2/1984 | Corsette | 222/309 |
| 4,454,964 | 6/1984 | Sacher | 222/43 |
| 4,516,727 | 5/1985 | Saito et al. | 239/333 |
| 4,530,449 | 7/1985 | Nozawa et al. | 222/189 |
| 4,690,312 | 9/1987 | Crapser et al. | 222/402.17 |
| 4,946,069 | 8/1990 | Fuchs | 222/43 |
| 4,986,453 | 1/1991 | Lina et al. | 222/321 |

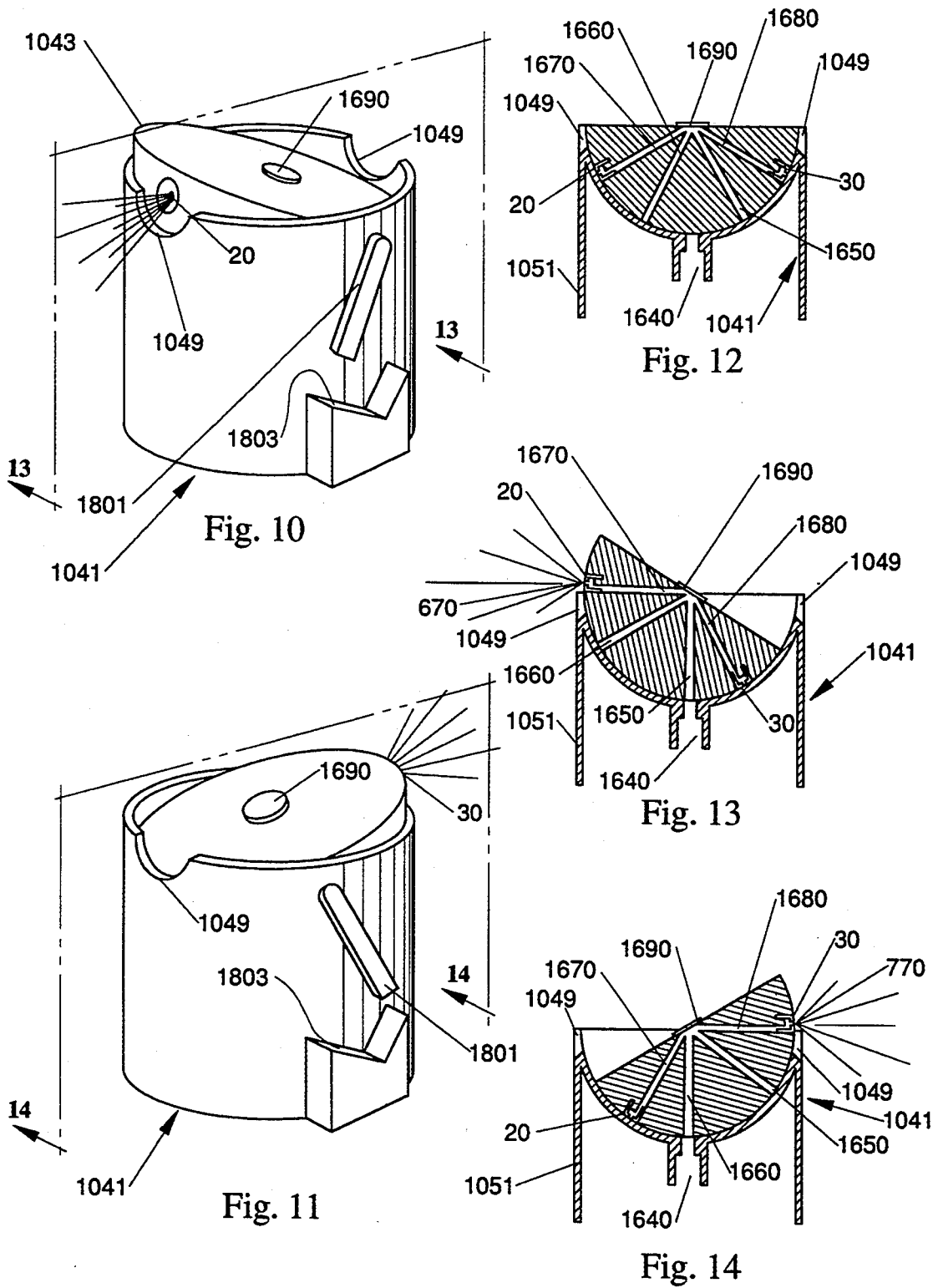

SPRAY PUMP PACKAGE EMPLOYING MULTIPLE ORIFICES HAVING AN ORIFICE SELECTOR SYSTEM

CROSS-REFERENCE TO RELATED APPLICATION

This is a continuation of my prior application, Ser. No. 08/096,636, entitled SPRAY PUMP PACKAGE EMPLOYING MULTIPLE ORIFICES FOR DISPENSING LIQUID IN DIFFERENT SPRAY PATTERNS WITH AUTOMATICALLY ADJUSTED OPTIMIZED PUMP STROKE FOR EACH PATTERN, filed on Jul. 22, 1993, now U.S. Pat. No. 5,337,926 and which is a continuation of my original application, Ser. No. 07/832,526, entitled SPRAY PUMP PACKAGE EMPLOYING MULTIPLE ORIFICES FOR DISPENSING LIQUID IN DIFFERENT SPRAY PATTERNS WITH AUTOMATICALLY ADJUSTED OPTIMIZED PUMP STROKE FOR EACH PATTERN, filed Feb. 7, 1992, which was withdrawn from issue on Jul. 22, 1993, and abandoned on Dec. 6, 1993.

TECHNICAL FIELD

The present invention has relation to liquid spray dispensing packages.

In a particularly preferred embodiment, the present invention has further relation to liquid spray dispensing packages which employ a manually actuated pump to pressurize the liquid and therefore do not require an aerosol propellant.

The present invention has further relation to such liquid spray dispensing packages wherein at least two distinct spray orifices capable of producing dissimilar spray patterns or dissimilar spray characteristics are provided, but wherein the maximum amount of product which can be delivered on each complete pump stroke is automatically adjusted to a predetermined optimum for whichever orifice is selected by the user.

The present invention has further relation to such liquid spray dispensing packages wherein the foregoing feat is accomplished by providing means for automatically adjusting the maximum length of pump stroke whenever the user changes from one orifice to the other.

BACKGROUND ART

Liquid spray dispensers of various types are well known in the art. Many of these dispensers are of the aerosol variety wherein a precharged gaseous propellant is used to pressurize the contents of the package and produce a spray when an actuating means is triggered by the end user. Typical applications for such dispensers include spray paints, deodorants, hair sprays, adhesives, disinfectants and the like.

Because the conditions of use may vary widely for a given product, e.g., as in the application of a spray glue to either a large surface for overall bonding or to only a small portion of a surface for localized bonding, it has been found desirable on some such applications to provide aerosol packages having more than a single discharge orifice capable of altering the spray pattern for the material being dispensed. This allows the user to select whatever spray pattern best suits his or her needs in any given circumstance by simply rotating the discharge nozzle on the package from one orifice to another. One example of a package of this general type is disclosed in U.S. Pat. 3,083,872 issued to Meshberg on Apr. 2, 1963.

Unfortunately, the use of an aerosol propellant to dispense a liquid spray can give rise to material compatibility problems between the liquid being dispensed and the propellant. In addition, pressurization of the dispensing package can increase the cost of manufacture and possibly contribute to environmental problems due to escape of the propellant to the atmosphere either during dispensing of the liquid product or upon disposal of the package.

Accordingly, there has been significant effort devoted toward development of liquid spray dispensing packages which do not require the use of an aerosol propellant and which can be pressurized by the user during the dispensing cycle. The most typical approach has been to employ a positive displacement liquid pump within the dispensing package. The pump is capable of being manually actuated by manipulation with by the user's index finger.

Pump spray dispensing packages employing multiple spray orifices are also known. An exemplary package of this type is disclosed in 1987 Japanese Utility Model No. Showa 62-38766 in the names of Kishi and Goto and filed by Yoshino Kogyosho Co., Ltd. While the positive displacement pump approach has done much to solve the material compatibility and environmental concerns associated with aerosol packages, it has been found that the use of more than a single dispensing orifice in a manually pressurized spray dispensing pump can give rise to underwetting or overwetting problems when the user moves the nozzle from one orifice to another, particularly if the user fully depresses the pump actuating means for each stroke of the pump. It is believed that these underwetting/overwetting problems are more pronounced with packages employing manually actuated pumps because, unlike aerosol packages, users tend to hold a pump package in a substantially fixed position for each stroke of the pump and then move the package from one position to the next between pump strokes.

The aforementioned difficulties are most apparent in applications such as hair spray, where the user may want a broad spray pattern for overall treatment of their hair, but only a very narrow spray pattern to produce styling highlights. If the orifice designed to produce a very narrow spray pattern for styling highlights delivers the same total amount of product that is used for overall treatment of the user's hair on each pump stroke, there will be a strong tendency to overwet the portion of the user's hair being spot treated. Conversely, if the package is designed to optimize the amount of product to be delivered during spot treatment, the amount of product delivered on each full pump stroke will most likely be too low when the user selects the broad spray pattern for overall treatment of their hair. This will, in most instances, result in underwetting.

The prior art solution to overwetting/underwetting problems of the aforementioned type in multiple orifice packages employing manually actuated pumps has been to employ a single maximum pump stroke which is a compromise between the extremes required by the different spray orifices, resulting in a liquid application amount per unit of area being treated which is not completely satisfactory for any of the spray orifices.

Another disadvantage of prior art liquid dispensing packages having multiple spray nozzles is that when the selection is made from one nozzle to the next, the dispenser may have to be regripped in order to point the newly selected nozzle in the desired direction. That is, the nozzles are fixed relative to the liquid container so that all nozzles point in different directions. Therefore, rotation of the container in the user's hand is needed to re-aim the newly selected nozzle toward the same target to which the previous nozzle was aimed.

OBJECTS OF THE INVENTION

It is therefore an object of the present invention to preserve all of the advantages of prior art multiple orifice pump spray liquid dispensing packages, while eliminating the overwetting/underwetting problems which typically occur when the user moves the position of the spray nozzle from one orifice to another.

It is another object of the present invention to eliminate problems of the aforementioned type without the need to compromise on the amount of liquid being applied per unit of area being treated regardless of which spray orifice is selected by the user.

It is another object of the present invention to provide such a multiple orifice pump spray liquid dispensing package wherein the maximum available pump stroke is automatically adjusted to provide the optimum amount of liquid product discharge for the particular orifice which has been selected by the user.

It is yet another object of the present invention to provide a spray orifice selector system which moves the spray orifices relative to the container so that whichever spray orifice is selected, it will he aimed toward the same target as the previously selected spray orifice, without having to regrip or rotate the container in the user's hand.

DISCLOSURE OF THE INVENTION

The present invention provides the end user with a manually operated spray pump package capable of delivering two or more different predetermined spray patterns or spray characteristics, but at a liquid application amount per unit of area being treated which is optimum for the particular spray orifice selected rather than a compromise between two extremes. The predetermined spray patterns or characteristics from which the end user may select may differ in many different ways, including but not limited to: the cone angle of the spray; the width of the spray pattern; the average size of the particles in the spray; the amount of particle size deviation from the average; etc. The predetermined spray patterns or characteristics available to the user of pumps of the present invention can be distinguished by a difference in any one of the foregoing variables or by differences in combinations of two or more of the foregoing variables. For example, a first predetermined spray pattern might be a narrow pattern with relatively large particles, while a second predetermined spray pattern from a different orifice on the same spray pump liquid dispensing package might be a wide pattern with smaller particles.

However, packages of the present invention, unlike packages of the prior art, are provided with means for automatically adjusting the maximum available pump stroke so as to optimize the maximum amount of product which can be delivered on each complete pump stroke for whichever orifice is selected by the end user. Thus, in the preceding example the maximum available pump stroke may, if desired, be adjusted to deliver a large dose for the wide spray pattern and a smaller dose for the narrow spray pattern.

Accordingly, manually pressurized packages of the present invention permit delivery of a single product, such as a hair spray, under widely differing conditions to meet different requirements experienced by the end user of the product. For example, the hair spray may be applied in a wide pattern at a relatively low amount per unit of area to all of the user's hair using a first spray pattern or to a much narrower localized portion of the user's hair for styling purposes using a second much narrower spray pattern wherein the amount of material applied has been automatically reduced to avoid overwetting the relatively small surface being treated. This is accomplished by providing the package with means for automatically changing the maximum stroke length available to the pump whenever the position of the spray nozzle is changed from one orifice to another by the end user.

In a particularly preferred embodiment of the present invention, the package employs a positive displacement pump which is self priming regardless of stroke length.

BRIEF DESCRIPTION OF THE DRAWINGS

While the specification concludes with claims that particularly point out and distinctly claim the subject matter regarded as forming the present invention, it is believed that the invention will be better understood from the following detailed description with reference to the drawings in which:

FIG. 10 is a simplified perspective illustration of an alternative push button including an orifice selector means suitable for use in packages of the present invention, said view showing the position of the orifice selector means when the pump stroke is to be limited via interference between an arm on the orifice selector means and a fixed stop secured to a stationary portion of the package;

FIG. 11 is a simplified perspective view of the push button shown in FIG. 10, but showing the position of the orifice selector means when no external limitations are to be imposed upon the maximum stroke of the liquid pump;

FIG. 12 is a simplified cross-sectional view of the push button and orifice selector means generally shown in FIGS. 10 and 11 with both spray orifice inserts and the interconnecting liquid passageways in the selector means in a sealed condition;

FIG. 13 is a simplified cross-sectional view of the push button and orifice selector means shown in FIG. 10, said view being taken along Section Line B—B in FIG. 10;

FIG. 14 is a simplified cross-sectional view of the push button and orifice selector means shown in FIG. 11, said view being taken along Section Line C—C in FIG. 11.

DETAILED DESCRIPTION OF THE PREFERRED EMBODIMENT

Figure 1:
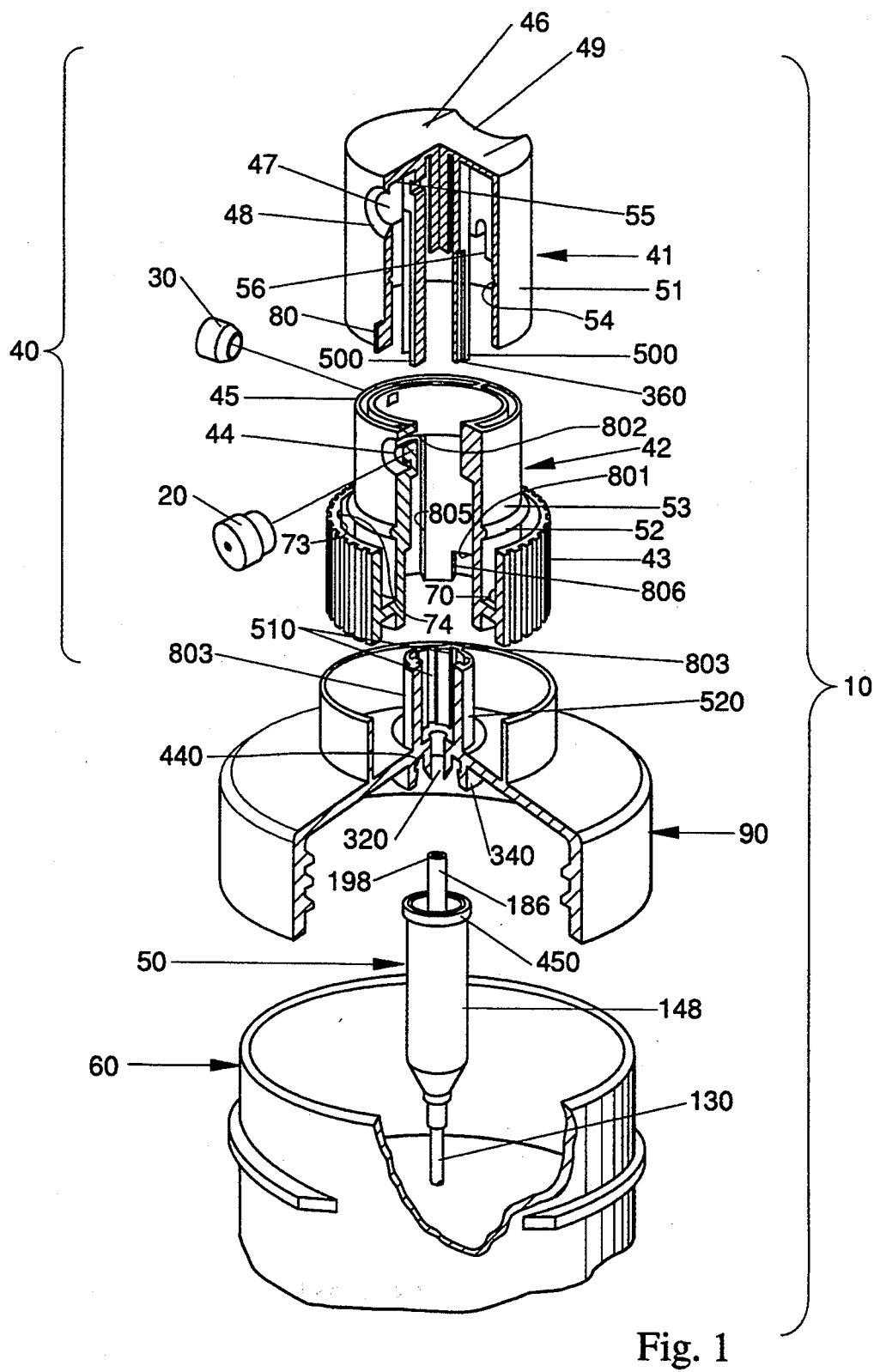
FIG. 1 is a simplified enlarged, exploded perspective view of a preferred manually pressurized liquid dispensing package of the present invention.

A particularly preferred liquid dispensing pump embodiment 10 disclosed in the partially exploded and partially segmented view of FIG. 1 provides the user with a choice of two spray patterns: either a narrow or a wide spray pattern. In the illustrated embodiment, each spray pattern is automatically coupled with the proper predetermined dose so the pump delivers a substantially uniform amount of product per unit of area being treated for either spray setting. In this way product may be applied with either a large spray cone diameter or a small spray cone diameter without underwetting or overwetting the surface being treated. For example, the narrow spray of the preferred liquid dispensing pump embodiment 10 which is delivered through spray orifice insert 20 may deliver 40 mg of liquid product with a spray cone diameter of 2 inches (measured at a 6 inch distance from the orifice insert). The wide spray which is delivered through spray orifice insert 30 may deliver 160 mg of liquid product with a 4 inch diameter spray cone (measured at a 6 inch distance from the orifice insert). In this case either spray pattern will apply a substantially uniform amount of approximately 13 mg of liquid product per square inch of surface being treated, as measured at a 6 inch distance from the orifice insert.

The preferred liquid dispensing pump embodiment 10 shown in FIG. 1 includes: an actuator assembly 40; a pump assembly 50; and a wide mouth container, such as a plastic bottle 60.

The actuator assembly 40 of the preferred embodiment 10 is comprised of four pieces: a push button 41, a turret 42 with an integral thumb wheel 43, and two spray orifice inserts 20 and 30. Insert 20 is designed to produce a narrow spray pattern, while insert 30 is designed to produce a wide spray pattern.

The turret 42 has two seats 44 and 45 designed to frictionally engage the two spray orifice inserts 20 and 30, respectively. The spray orifice seats 44 and 45 and the spray orifice inserts 20 and 30, respectively, are of the conventional pressure-swirl design which is commonly used for spray pumps. The geometry and the dimensions of the seats and the passages in the spray orifice inserts 20 and 30 are chosen by methods well known in the art to provide the desired spray cone diameters, droplet size and patterns for the particular product application. The spray orifice inserts 20 and 30 are preferably pressed into the seats 44 and 45, respectively. The spray orifice inserts 20 and 30 are preferably spaced approximately 90 degrees apart from one another.

The push button 41 preferably has a contoured finger pad 49 comprising a depressed area on the top surface 46 of the button. The depressed area is preferably shaped to conform to the user's index finger. The finger pad 49, which also preferably exhibits a slight upward slope in the direction of the particular spray orifice insert which has been selected for use, serves to align the user's finger in the direction of the spray so the user is able to accurately anticipate the direction of spray.

There is an aperture or opening 47 for the spray to pass through in the wall 51 of the button 41. The opening 47 is aligned with the longitudinal axis of the depressed area comprising the finger pad 49. The spray opening 47 preferably has a beveled edge 48 so as to form a sharp corner with an acute angle where the edge of the opening 47 meets the inside surface of the wall 51.

The button 41 and the turret 42 are preferably held together in their axial direction by a snap bead 52, which is located on the outside surface of the turret wall 53 in the area below the spray orifice inserts 20 and 30, and a snap groove 54 located on the inside surface of the button wall 51.

The turret 42 can be rotated with respect to the button 41 by turning the thumb wheel 43. Because the button 41 is non-rotatably secured relative to both the pump 50 and closure 90, rotation of the thumb wheel 43 allows the user to select the desired spray orifice and hence the desired spray pattern. The selection of spray orifices will be described in greater detail in the latter portions of the present specification.

The push button 41 has six supports 55 on its inside surface, said supports being spaced equally around the button's perimeter at the junction of the finger pad 49 and the wall 51. The supports 55, which are not all of uniform overall height due to the depressed area comprising the finger pad 49, bear on the top of the turret 42 at its periphery. The button 41 and turret 42 are assembled by aligning their axes and rotating the button 41 until the spray opening 47 lies in the same quadrant as the spray orifice inserts 20 and 30 in the turret 42. When the button 41 and turret 42 are thus properly positioned the two are snapped together.

A clicker 56 on the push button 41 creates an audible signal as the thumb wheel 43 is turned to or from each of the spray settings. As shown in FIG. 1, the clicker 56 is a thin projection extending downwardly from the base of the button 41. The clicker 56 is deflected and released during movement of the thumb wheel 43 to create an audible click.

The clicker 56 shown in FIG. 1 is located 180 degrees from the spray opening 47 in the push button 41. As can be seen in FIG. 1, a portion of the wall 51 of the button is cut away on each side of the clicker 56 to increase its effective length without increasing the clearance needed below the button 41. The tip of the clicker projects slightly below the base of the button 41 so it strikes trigger 70 (shown in FIG. 1) or trigger 71 (not shown in FIG. 1), depending upon which of the spray orifices 20 or 30 is selected by the user when the thumb wheel 43 is turned. One of the triggers 70 or 71 makes contact with the clicker 56 just before the particular spray orifice which has been selected by the user becomes aligned with the spray opening or aperture 47 in push button 41. Trigger 70 and trigger 71 comprise vanes oriented radially in the groove between the thumb wheel 43 and the wall 53 of the turret 42 at points opposite spray orifice inserts 30 and 20, respectively.

The clicker 56 clears the bottom of the groove formed between the turret wall 53 and the thumb wheel 43 when the thumb wheel 43 is rotated relative to the push button 41, but the clicker 56 and triggers 70,71 interfere with each other as the thumb wheel 43 is rotated from one orifice insert to the other. This interference causes the clicker 56 to deflect as the triggers 70, 71 pass underneath. Once a trigger 70 or 71 passes beneath the clicker 56, the clicker 56 snaps back to its original position with an audible click.

A detent, which serves to indicate a shipping or travelling position of the package 10 in which both orifice inserts are sealed and the pump 50 cannot be manually actuated, is located halfway between the two spray settings. This "locked" condition of the pump 50 will be described in greater detail in the latter portions of the present specification. The detent is preferably comprised of a flat 73 on the upper inside surface of the thumb wheel 43, as shown in FIG. 1. A vertical groove 74 is formed in the flat 73 at its midpoint. A vertical rib 80 (partially shown in FIG. 1) is formed on the base of the push button's wall 51 directly below the spray opening 47. The rib 80 is designed to mate with the groove 74 formed in the thumb wheel 43 when the turret is mid-way through its travel from one orifice to the other.

When the thumb wheel 43 rotates with respect to the button 41, the rib 80 on the button's wall 51 normally clears the inside surface of the thumb wheel 43. However, approximately halfway between the two spray orifices 20 and 30 the rib 80 contacts the flat 73 and resiliently deforms and interferes with the flat 73 until the rib 80 pops into the mating groove 74 in the flat 73. If the thumb wheel 43 is rotated in either direction, the rib 80 immediately interferes with the flat 73. The detent thus formed requires the user to exert somewhat more than the normal amount of force that is required for turret rotation in order to select one of the spray orifice inserts for dispensing. The detent position is particularly suitable for transporting and or storing the liquid dispensing package 10 either prior to placing the package in service or when the end user of the package is travelling, since the liquid dispensing pump 50 is prevented from actuating unless one of the spray orifice inserts is aligned with the opening 47 in push button 41.

The manually operated positive displacement liquid pump assembly 50 employed in the liquid dispensing package 10 shown in FIG. 1 is preferably of the self-priming type regardless of how much it is depressed from its at rest position by the user. While the present invention may be practiced with pumps of many different designs, one particularly suitable pump of the aforementioned type is generally disclosed in U.S. Pat. No. 4,986,453 issued to Lina et al. on Jan. 22, 1991 and hereby incorporated herein by reference. Such a pump 50 is shown schematically in the simplified cross-section of FIG. 2, and is comprised of: the pump body 148; spring 240; sealing conduit 190; poppet 150; piston 182 with integral pump stem 186; and dip tube 130. The pump 50 is secured to closure 90.

The finger-operated pump 50 is provided with a pump chamber 180 and a fixed supply conduit 120 communicating with the pump chamber. A movable sealing conduit 190 is adapted to slidably and sealingly engage the supply conduit 120 in a telescoping relationship. A primary piston 182 is operably disposed in the chamber 180 and defines a discharge passage 198 out of the pump chamber. A poppet 150 having a primary valve means 162 for occluding the discharge passage is biased against the primary piston 182 by a spring 240. The poppet 150 has a secondary valve means comprising concave valve member surface 280 for occluding flow through the sealing conduit 190. The sealing conduit 190 engages the poppet through a lost motion arrangement which is defined in part by the spring 240. The lost motion arrangement permits a limited degree of relative movement between the poppet 150 and the sealing conduit 190 when the primary piston 182 is moved up and down by actuation of the push button 41.

DISCHARGING LIQUID FROM THE PUMP

Dispensing of liquid (not shown in FIGS. 1-9) from a primed pump 50 is initiated by applying a downward force on the actuator head or push button 41 so as to begin to move the primary piston 182 downwardly in the pump chamber 180. The poppet 150 is also necessarily forced downwardly by the primary piston 182 with which it is engaged. The sealing conduit 190 continues to be supported by the spring 240 until the inwardly projecting annular seal 260 at the bottom end of the sealing conduit 190 engages the exterior of the top end 121 of the supply conduit 120, as illustrated in FIG. 4. At this point, there is sufficient frictional engagement between the sealing conduit 190 and the supply conduit 120 to retard further downward movement of the sealing conduit 190 under its own weight. Until this engagement occurs, the pump chamber 180 cannot be pressurized since the pump chamber is in fluid communication with the interior of the container 60 through the supply conduit 120.

As illustrated in FIG. 4, the sealing conduit 190 thus remains stationary and engaged with the fixed supply conduit 120 while the primary piston 182 and poppet 150 continue moving downwardly together relative to the sealing conduit 190. The range of downward movement of the poppet 150 that is permitted by the lost motion arrangement between the poppet 150 and sealing conduit 190 is such that concave valve member surface 280 of the poppet 150 eventually seals against the peripheral contact surface 218 at the top of the sealing conduit 190.

Until this sealing engagement occurs at the top of the sealing conduit 190, any tendency of the downwardly moving primary piston 182 to pressurize the pump chamber 180 can result in a very small amount of the liquid and/or residual air (or vapor) being forced from the pump chamber 180 down the fixed supply conduit 120 into the container 60. After the sealing engagement occurs between the poppet 150 and the top of the sealing conduit 190, fluid communication between the container 60 and the pump chamber 180 is interrupted, and the pump chamber 180 becomes increasingly pressurized with increasing downward movement of the primary piston 182.

Once the poppet 150 engages the top surface 218 of the sealing conduit 190, any continued downward movement of the poppet 150 will necessarily effect downward movement of the sealing conduit 190 along the fixed supply conduit 120 with the sealing engagement being maintained between the poppet secondary valve means surface 280 and the sealing conduit's peripheral contact surface 218.

Figures 5, 6:
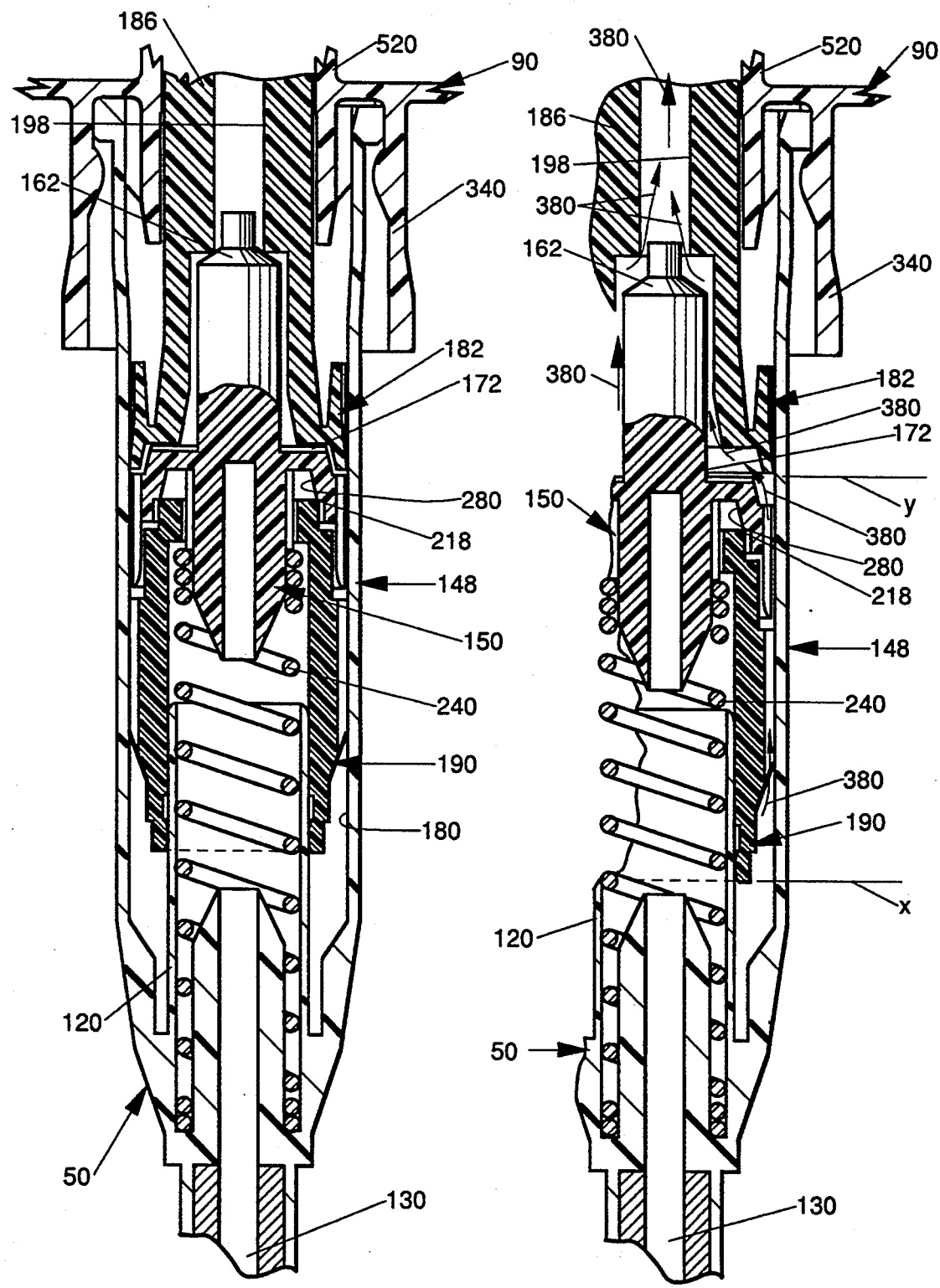

FIG. 5 illustrates the relationship of the pump components at a point of maximum pressure just before the liquid (not shown) is first discharged upwardly out of the pump chamber 180. The elevation of the primary piston 182 in the chamber 180 at the point of maximum chamber pressure depends upon the strength of the spring 240 as well as upon the initial chamber liquid load conditions (i.e., the amount of liquid and/or residual air (or vapor) initially in the pump chamber 180).

At the point of maximum pressurization, the degree of compression of the liquid and entrapped residual air and/or vapor within the pump chamber 180 is such that the force generated by the pressure acting downwardly on the poppet piston surface 172 exceeds the upward force of the spring 240, with the result that the poppet 150 moves downwardly at a greater velocity than the primary piston 182. This, in turn, causes the primary valve means sealing surface 162 to open the discharge passage 198, and to remain open as long as a differential pressure sufficient to maintain the condition shown in FIG. 6 persists.

During the time that the discharge passage 198 is open, the liquid product (not shown) is discharged through the passage 198 as illustrated by the flow arrows 380 in FIG. 6. The liquid is thus forced under pressure to the nozzle assembly where it is discharged from one of the spray orifice inserts 20 or 30 as a finely atomized spray or stream.

Figure 7:
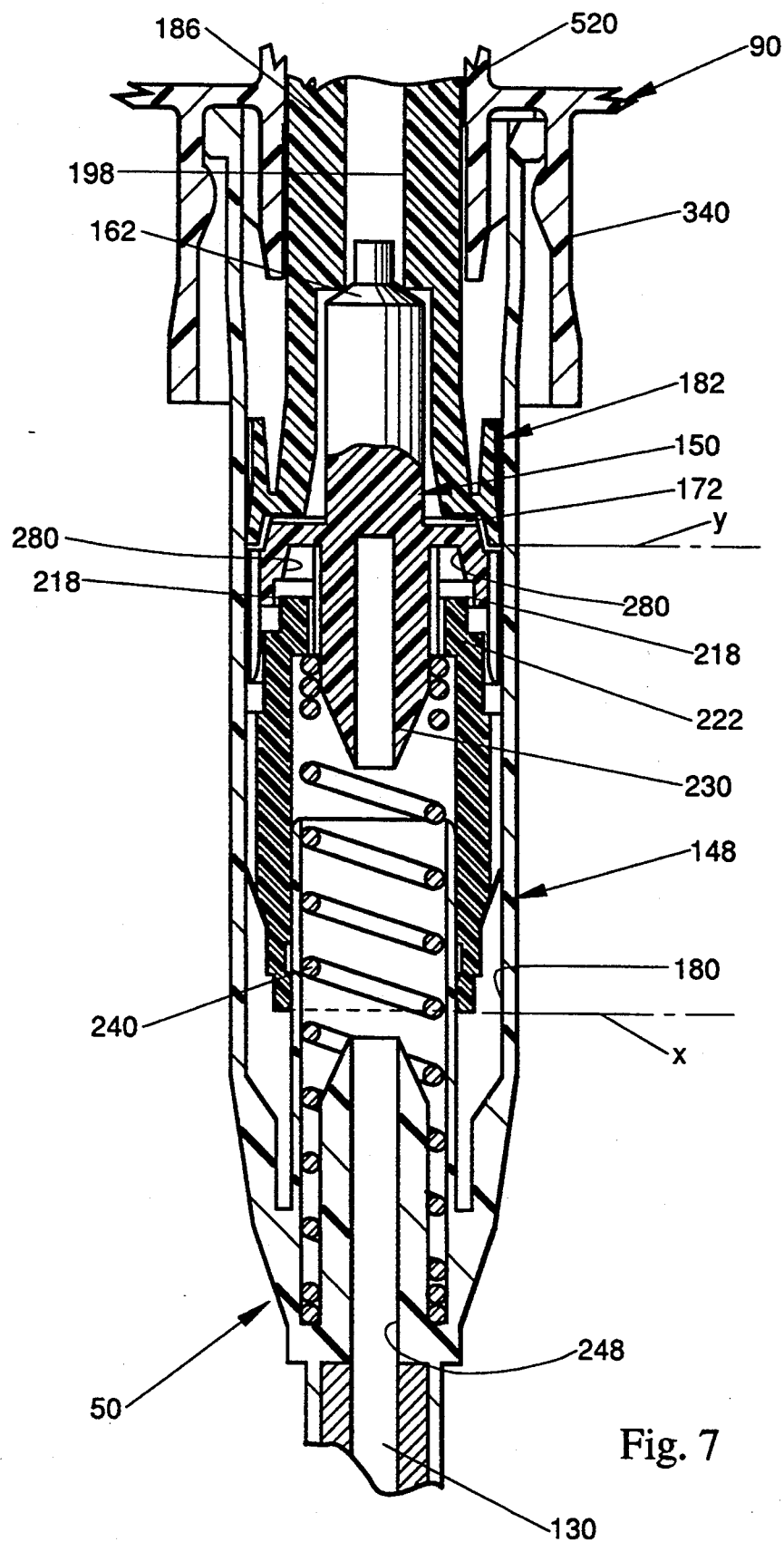

If the downward movement of the primary piston 182 is substantially slowed or completely stopped at, for example, elevation Y as illustrated in FIG. 6, then the sealing conduit 190 will stop along the inlet conduit 120 at, for example, elevation X as illustrated in FIG. 6. The spring 240 will subsequently force the poppet 150 back upwardly against the primary piston 182 as illustrated in FIG. 7 to occlude the discharge passage 198 after a sufficient amount of the pressurized liquid has been discharged to restore equilibrium. That is, the discharge of the liquid from the pump 50 is terminated whenever the pressure drops below the predetermined operating pressure, which is established by the spring 240 operating through the other pump components. Since the liquid is thus always discharged at a predetermined pressure, proper atomization can be ensured by employing a suitable spray orifice insert. Accordingly, there is very little tendency for the pump to dribble from the spray orifice.

When the poppet 150 moves upwardly toward the primary piston 182 to occlude further discharge from the pump (FIG. 7), the sealing conduit 190 initially remains stationary owing to its frictional engagement with the supply conduit 120. Thus, the poppet 150 will separate from the top of the sealing conduit 190.

Eventually, as the poppet 150 moves upwardly far enough to seal against the discharge passage 198, the top of the spring 240 around the poppet pin 230 will engage the sealing conduit 190 (FIG. 7). If the primary piston 182 has been maintained at the initially depressed elevation, say at elevation Y in FIGS. 6 and 7, then the poppet 150 will reclose the discharge passage 198 at the same instant the top of the spring 240 again just engages the sealing conduit 190 which has remained at the elevation X. Thus, the upwardly moving poppet 150 separates from the sealing conduit 190 within the extent permitted by the spring in the lost motion arrangement. At this point, any residual pressure in the pump chamber 180 could force a small amount of the liquid (and or entrapped air and vapor) into the region under the poppet 150 from which region the flow passes down through the sealing conduit 190, through the fixed supply conduit 120, and into the container 60 via dip tube 130.

If, after being substantially slowed or stopped, the primary piston 182 is permitted to rise (for example, above elevation Y in FIG. 7), then the spring 240 will simultaneously urge the sealing conduit 190 and poppet 150 upwardly together in the spaced-apart relationship sown in FIG. 7 with the poppet 150 continuing to close off the discharge passage 198.

However, if the primary piston 182 is subsequently forced further downwardly in the pump chamber 180, the poppet 150 again seals against the top of the sealing conduit 190 so that additional downward movement of the primary piston 182 again begins to pressurize the pump chamber 180. If and when the maximum design pressure is again attained in the pump chamber 180, the poppet 150 is again forced away from the primary piston 182 to permit further discharge of liquid from the pump 180.

The sealing conduit 190, owing to its frictional engagement with the fixed supply conduit 120 during operation of the pump, will remain in place on the supply conduit 120 during pre-discharge pressurization of the pump chamber 180 even if the pump 50 is inverted. Thus, if the container 60 is inverted prior to spray discharge, pressure cannot be inadvertently vented to the container 60 so long as the piston 182 is continuously depressed to seal the poppet 150 against the sealing conduit 190 while the pump chamber is being pressurized—even at very low pressures.

Figure 8:
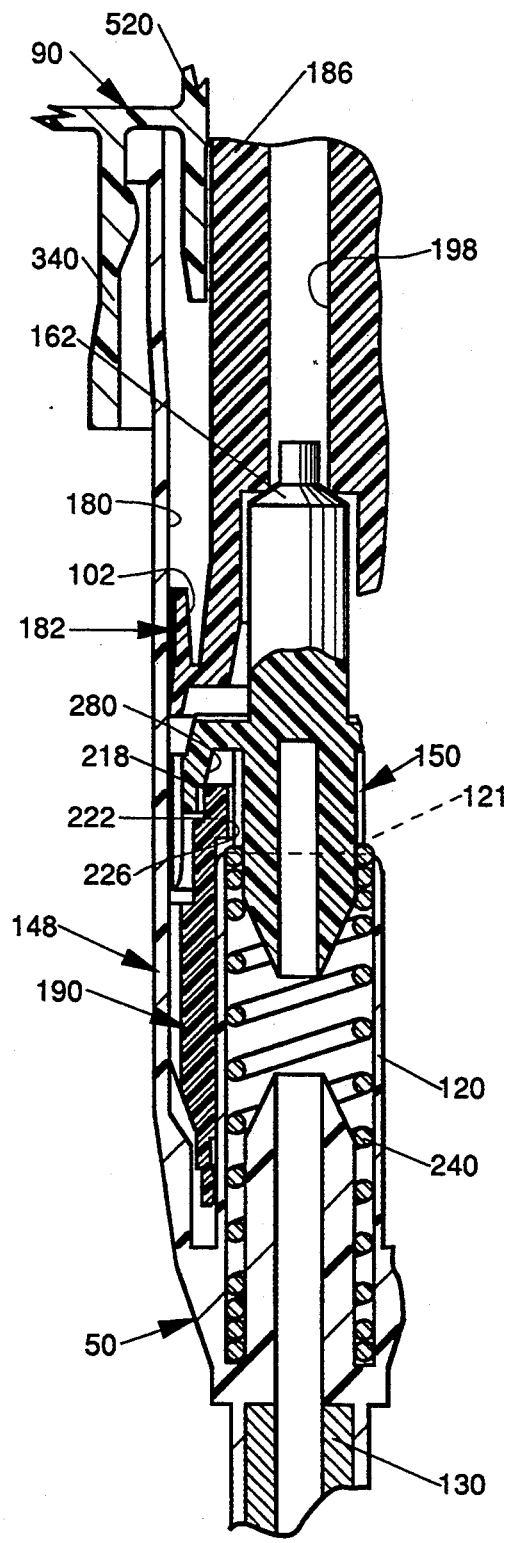

Assuming none of the pump stroke limiting devices described in the present specification are in a position to limit the downward travel of primary piston 182, the downward stroke of the primary piston 182 is mechanically terminated at the maximum stroke length illustrated in FIG. 8. At the bottom of the stroke, the primary piston 182, with the poppet 150 seated therein and the sealing conduit 190 sealingly engaged with the underside of the poppet 150, has moved sufficiently downwardly in the pump chamber 180 so that the sealing conduit top cross wall 222 abuts the open top end 121 of the fixed supply conduit 120.

Figure 2:
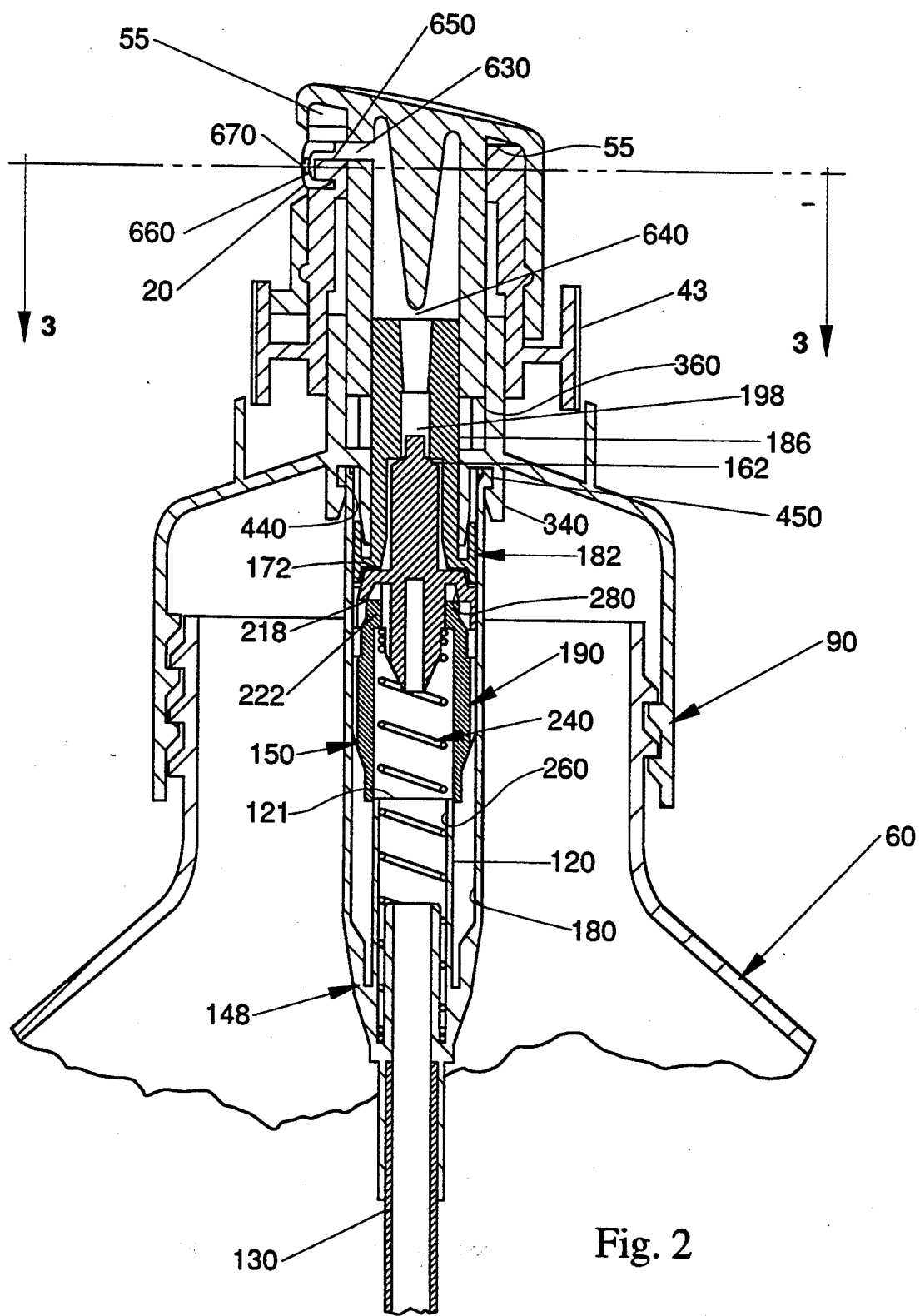
FIG. 2 is a simplified enlarged cross-sectional view of a fully assembled package of the type generally shown in FIG. 1 in its at rest position, said view being taken through one of the spray orifice inserts of the package.

Release of the finger pressure from the actuator button 41, either at the end of a full downward stroke when no stroke limiter of the present invention is present or at the end of a downward stroke which has been limited to an intermediate position by the presence of a stroke limiting device of the present invention, permits the spring 240 to return the piston 182 in pump 50 to its fully raised, inactive at rest position, as generally shown in FIG. 2.

It will, of course, be appreciated that a user may on occasion generate a sufficient amount of spray to meet his or her needs before the primary piston 182 either reaches the bottom of the maximum permissible stroke illustrated in FIG. 8 or before the downward progress of the piston is halted by a stroke limiting device of the present invention. In such situations the finger force on the top of the actuator button 41 would typically be released before the maximum available stroke has been attained. While the pump will still function in the manner described herein, the actual amount of liquid dispensed on such incomplete strokes will be less than the available capacity of the pump. It will thus be understood that only depression of the push button 41 to the maximum extent possible for each spray pattern selected will provide the desired predetermined amount of liquid discharge described herein for the particular spray orifice which has been selected by the user.

REFILLING OF THE PUMP

Figure 9:
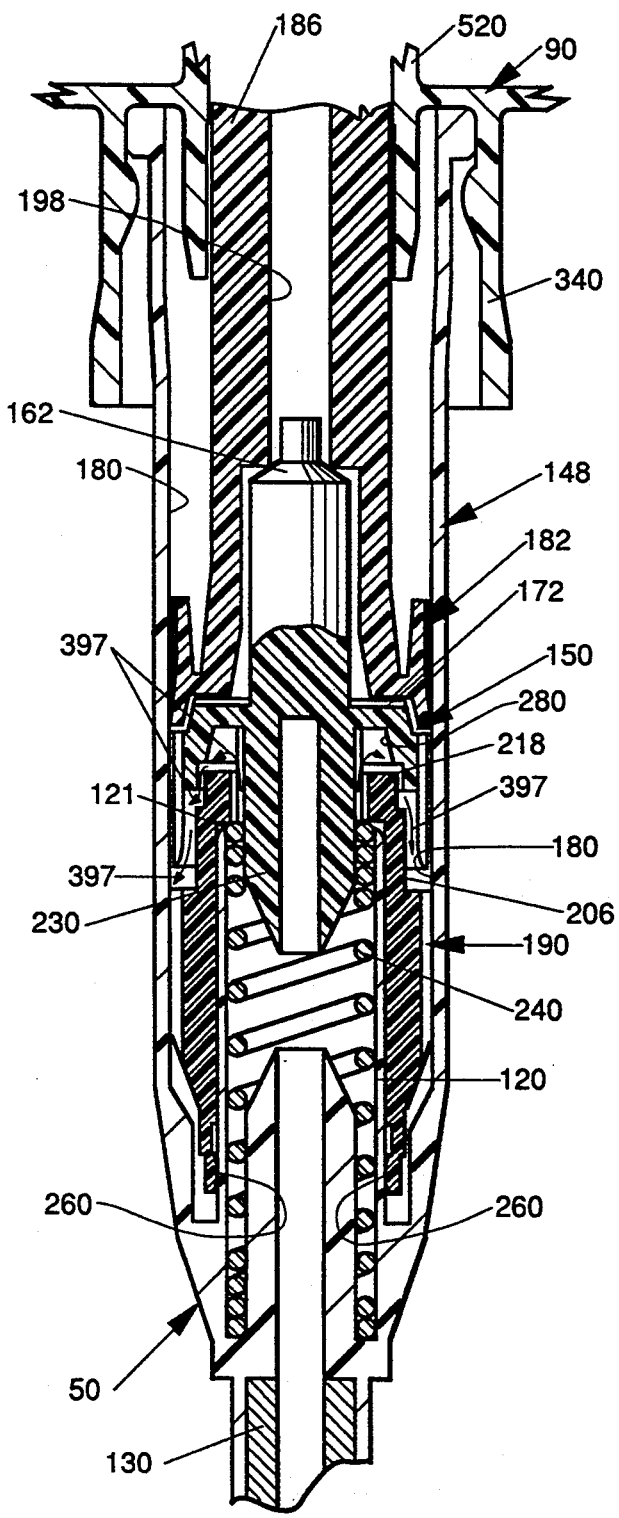

FIG. 9 illustrates the pump 50 just after the finger pressure on the actuator push button 41 has been released and just after the primary piston 182 has begun moving upwardly in the pump chamber 180 in response to the biasing force of the spring 240 pushing the poppet 150 against the primary piston 182. As the poppet 150 moves upwardly, the sealing conduit 190 initially remains frictionally engaged with the fixed supply conduit 120 so that the poppet 150 separates from the top of the sealing conduit 190 to the extent permitted by the lost motion arrangement (i.e., until the sealing conduit 190 is engaged by the spring 240). Fluid communication is thus established between the container 60 and the pump chamber 180 via dip tube 130.

As the upper end of the spring 240, sealing conduit 190, poppet 150, and piston 182 move upwardly together, the volume under the piston 182 continues to increase. This lowers the pressure in the chamber 180. As a result, the container liquid (not shown) which is at substantially atmospheric pressure, flows up the dip tube 130 over the top of the sealing conduit 190, and into the pump chamber 180 to refill the pump chamber, as indicated by the flow arrows 397 in FIG. 9. Liquid continues to flow from the container 60 into the pump chamber 180 until the primary piston 182 reaches its fully elevated position.

Near the end of the return stroke of the primary piston 182 to the fully elevated at rest position shown in FIG. 2, the bottom end of the sealing conduit 190 separates from the fixed supply conduit 120 and additional liquid fills the pump chamber 180 through the separation space.

ASSEMBLY OF THE PACKAGE

The closure 90 is placed over the pump body 148 of the pump 50 so that the pump stem 186 extends through the passageway 320 in the center of the lowermost collar 340 on the closure 90. The flange 450 on the pump body 148 is preferably snapped into the groove 440 located within the passageway 320 in the lowermost collar 340 on the lowermost side of the closure 90. The dip tube 130 is preferably pressed into the body 148 of the pump 50.

Spray orifice inserts 20 and 30 are inserted in spray orifice seats 44 and 45, respectively, in turret 42 and are preferably retained in position by means of a friction fit. The turret 42 and push button 41 are then preassembled with one another by engaging snap bead 52 on turret 42 in snap groove 54 in push button 41 so that spray orifice inserts 20 and 30 are free to align with spray opening 47 in push button 41.

The actuator assembly 40 comprising push button 41 and turret 42, the closure 90 and the pump 50 are preferably joined to one another by placing the closure 90 over the pump 50. The preassembled push button 41 and turret 42 are thereafter placed over the pump stem 186 so that the pump stem 186 frictionally engages the bottom of the stem 360 on push button 41. This assembly operation is preferably accomplished by rotating the push button 41 until the male splines 500 on the stem 360 of push button 41 are free to slide down the complementary internal grooves 510 in the uppermost hub 520 on the closure 90 when the turret 42 is in a position that will permit alignment of spray orifices 20 and 30 in turret 42 with spray opening 47 in push button 41.

Figure 3:
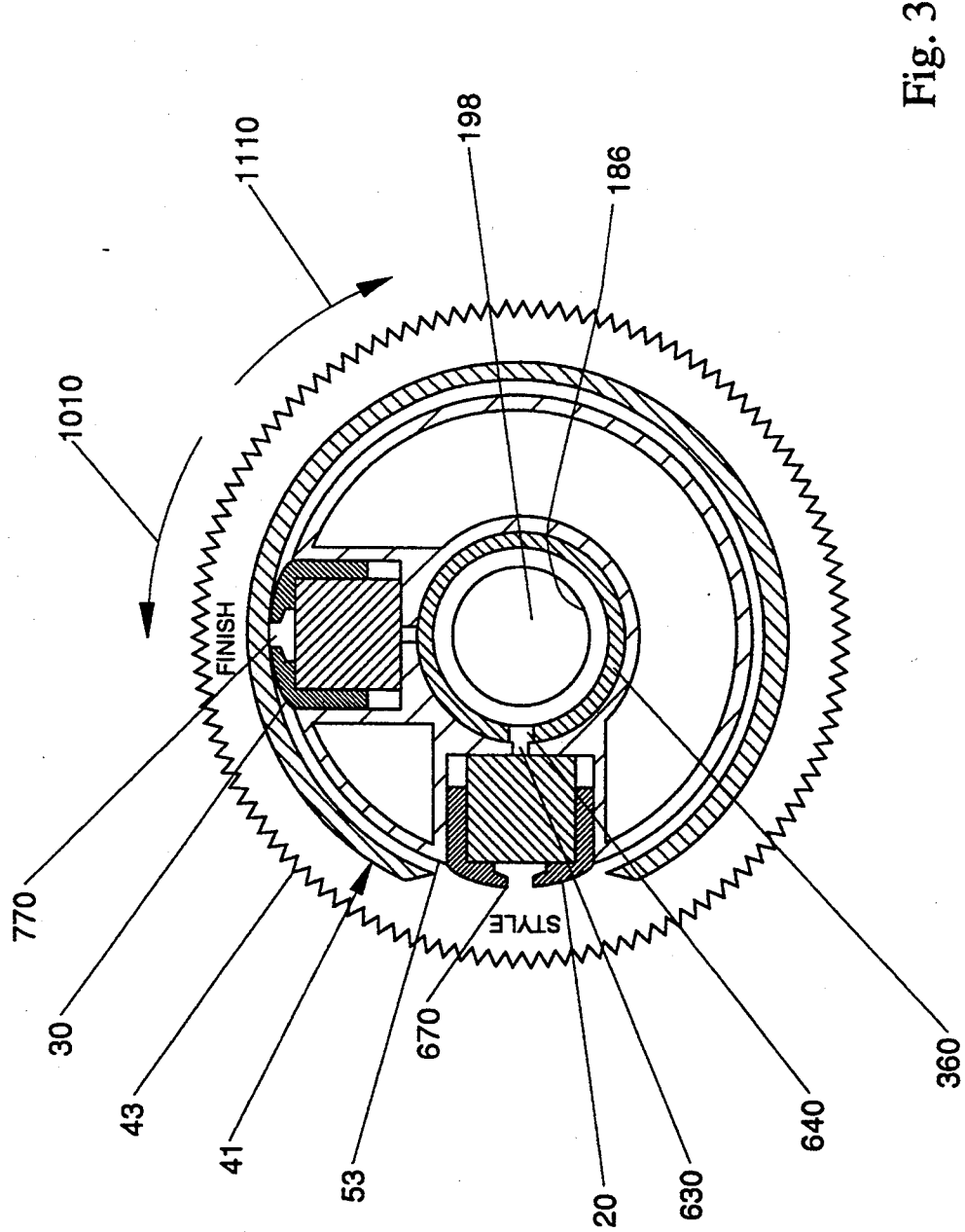
FIG. 3 is a simplified cross-sectional view of the package shown in FIG. 2, said view being taken along Section Line A—A in FIG. 2.
Figure 4:
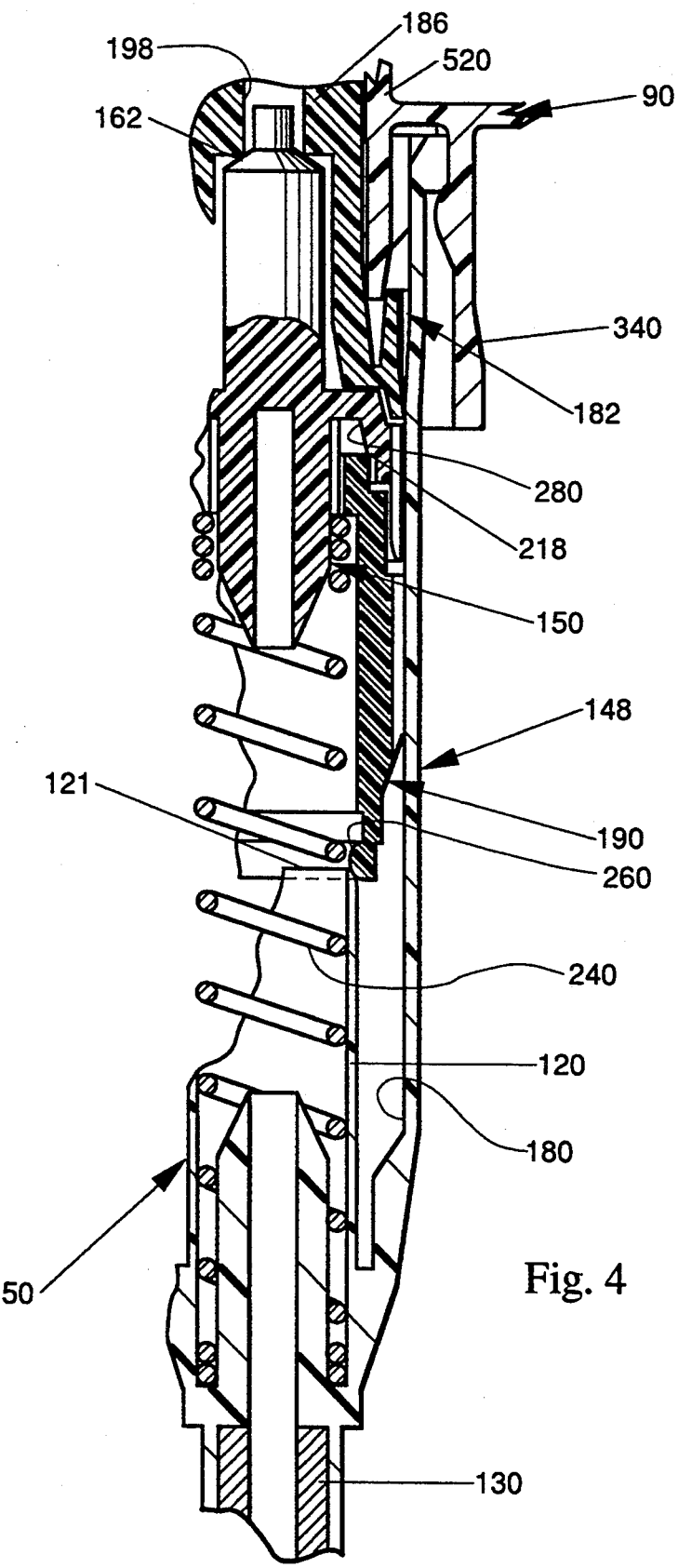
FIGS. 4, 5, 6, 7, 8 and 9 are enlarged cross-sectional views of the liquid pump generally shown in FIG. 2, but illustrating sequential positions of the pump components during a sequence of operation of the pump.

Assembling the package 10 in this manner prevents rotation of the push button 41 relative to the closure 9 and the pump 50, yet permits rotation of the multiple orifice containing turret 42 to the "FINISH" and "STYLE" positions shown in FIG. 3 via thumb wheel 43.

SELECTING THE DESIRED SPRAY ORIFICE

For the purpose of the following description, it will be assumed that the thumb wheel 43 is initially turned to select the narrow spray pattern provided via spray orifice insert 20, as shown in FIGS. 1, 2 and 3. This position is indicated by an arrow (not shown) on the button wall 51, said arrow being positioned directly below the spray opening 47. In this position the arrow (not shown) points to the word "STYLE" on the thumb wheel, as generally shown in the simplified cross-section of FIG. 3.

When the "STYLE" spray pattern is selected, as shown in FIGS. 1 and 2 and the simplified cross-section of FIG. 3, the "STYLE" spray orifice insert 20 is concentrically aligned within the spray opening 47 in push button 41. In this position the small hole 670 comprising the spray orifice in the narrow spray orifice insert 20 is in fluid communication with the liquid pump 50 via suitable passageways 660,650 inside the spray orifice insert 20 (shown only schematically in the cross-section of FIG. 2), passageway 630 in turret 42, the supply channel 640 in the stem 360 of push button 41 and discharge passageway 198 in pump stem 186. All of the foregoing passageways are sealingly secured to one another when the package 10 is in the condition shown in cross-section of FIG. 2. Therefore they collectively act as a conduit which places the liquid pump 50 in fluid communication with the spray orifice insert which has been selected by the user.

In the position shown in FIGS. 1, 2 and 3, the passageways leading to the wide spray orifice 30 are sealed by the outermost wall of the button stem 360. This can be seen in the cross-section of FIG. 3. In addition, the hole 770 comprising the spray orifice in the wide spray orifice insert 30 is itself sealed against the inside surface of the button's wall 51 by virtue of the raised face of the spray orifice insert 30. These seals prevent liquid product from drying and clogging the hole 770 in the wide spray orifice 30 when it is not in use.

The predetermined amount of liquid delivered at each spray pattern setting is, assuming full activation of push button 41 by the user, established by the maximum available length of the pump stroke. Vertical stops 801 and 802 formed on the inside surface of the turret 42 limit the stroke length and control the dosage for each spray pattern. In addition, the vertical stops 801 and 802 prevent actuation of the pump in the locked position.

Figure 1A:
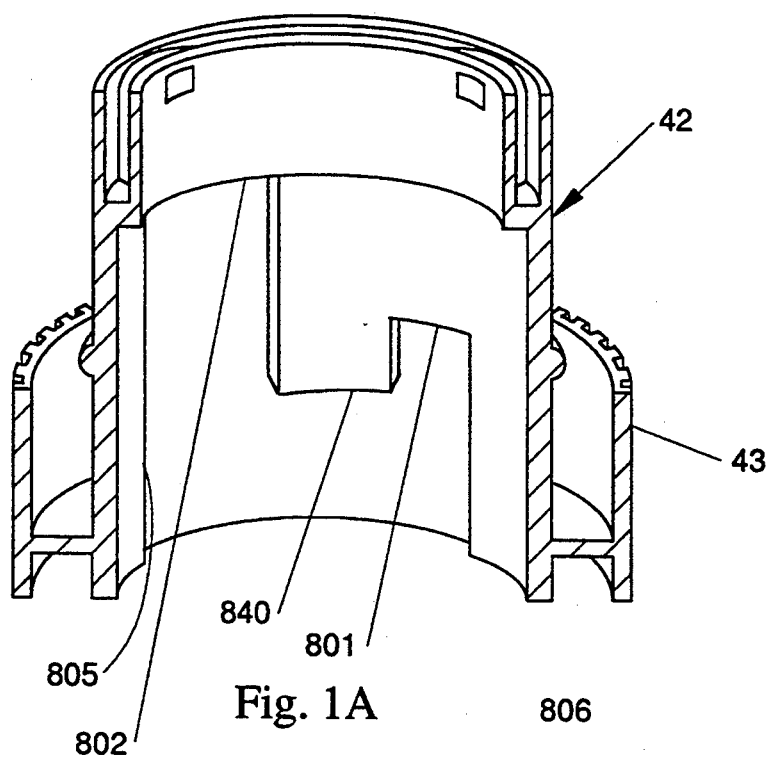
FIG. 1A is a simplified perspective view of the turret shown in FIG. 1, said view viewing partially segmented to more clearly illustrate the arrangement of the vertical stops located on the innermost surface of the turret.
Figure 1B:
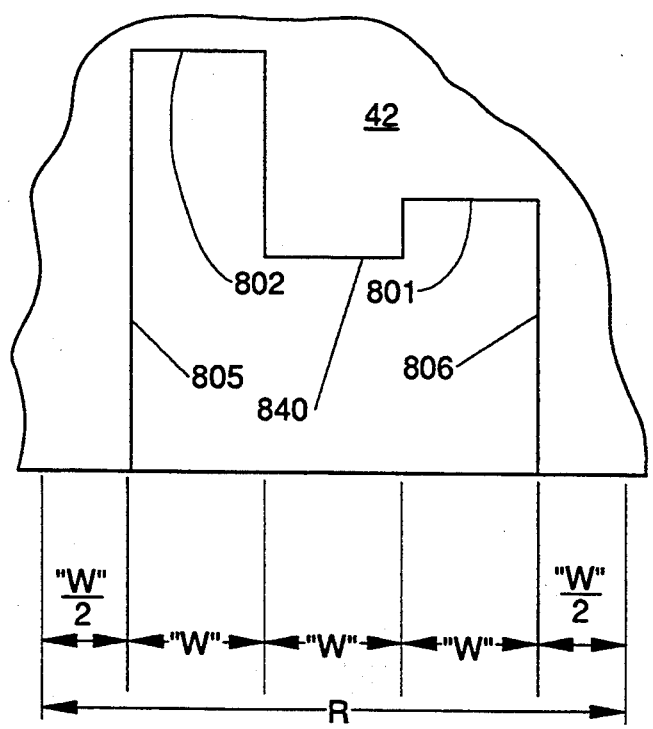
FIG. 1B is a fully developed view of one half of the innermost surface of the turret shown in FIG. 1A, said view showing the relative positions of the several vertical and rotational stops.

As can best be seen in FIGS. 1, 1A and 1B, vertical stop 801 is at a lower elevation than vertical stop 802, and therefore will provide a shorter maximum pump stroke. There are two identical diametrically opposed sets of vertical stops 801 and 802, equally spaced about the inside periphery of the lowermost thumb wheel portion of the turret 42. A pair of opposed lowermost vertical stops 840 which corresponds to the "locked" position of the pump are also provided. As can best be seen in FIG. 1, two identical equally spaced external followers 803 are provided on the outermost surface of uppermost collar 520 on the closure 90. When proper rotational alignment is achieved, either the opposed pair of vertical stops 801 or the opposed pair of vertical stops 802 engage the pair of opposed followers 803. When the opposed followers 803 do not rotationally align with either stops 801 or 802, vertical stops 840 prevent actuation of the push button 41. Thus the push button 41 is in a "locked" condition, i.e., it can only be actuated when one of the spray orifice inserts 20 or 30 is aligned with the spray orifice opening 47 in the push button.

When the thumb wheel 43 is rotated counter-clockwise to the "FINISH" position as shown by the arrow 1010 in FIG. 3 to align the wide pattern spray orifice insert 30 with opening 47 in push button 41, both followers 803 strike a rotational stop 805 comprising a vertically oriented edge of each of the opposed vertical stops 802 on turret 42. In this position the push button 41 and turret 42 are free to move down the full depth of the stops 802 for a full pump stroke. In the exemplary embodiment described herein, this setting will deliver a full dose of 160 mg for the wide spray pattern.

When the thumb wheel 43 is rotated clockwise, as shown by arrow 1110 in FIG. 3, the followers 803 strike a rotational stop 806 comprising a vertically oriented edge of each of the opposed vertical stops 801 on turret 42 when the narrow spray orifice insert 20 aligns with the opening 47 in push button 41. In this position the actuator assembly comprising push button 41 and turret 42 are free to vertically travel only the depth of the shorter vertical stops 801. To provide the same amount of liquid product per unit of surface area being treated this means that the maximum pump stroke of the exemplary embodiment described herein should, in the latter position, be approximately 25 per cent of the maximum pump stroke possible when spray orifice insert 30 is concentrically aligned with opening 47 in push button 41. Accordingly, pump 50 should deliver a dose of only about 40 mg of liquid for the "STYLE" setting of thumb wheel 43.

SELECTING THE "LOCKED" POSITION OF THE PUMP

When the thumb wheel 43 is turned to a position anywhere between the two extremes which align either spray orifice insert 20 or spray orifice insert 30 with opening 47 in push button 41, the opposed followers 803 are not aligned with either pair of vertical stops 801 or 802. In this situation the lowermost vertical stops 840 shown in FIGS. 1A and 1B prevent the push button 41 from moving down at all. Accordingly, actuation of the pump 50 is likewise prevented. This condition is referred to herein as the "locked" condition.

THE AUDIBLE SIGNAL

As will be understood from the preceding portions of the present specification, to select the wide spray orifice insert 30 beginning from the position shown in FIG. 3 the thumb wheel 43 is rotated counter-clockwise in the direction of arrow 1010 to align both orifice insert 30 and the "FINISH" designation on the thumb wheel 43 with spray orifice opening 47 in push button 41. As the thumb wheel 43 starts to move, the trigger 71 (not shown) opposite the small hole 670 comprising the spray orifice in orifice insert 20 strikes the clicker 56 and produces an audible click. As the thumb wheel 43 rotates, the button 41 remains fixed and the turret 42 rotates inside the button. The push button 41 is held in a fixed position by the six male splines 500 on the outside of the button stem 360 which engage six mating female splines 510 on the interior surface of the uppermost collar 520 which is centrally located on the closure 90, which in turn is secured to the container 60 by any suitable fastening means, such as complementary screw threads. As the thumb wheel 43 continues rotating, the small hole comprising spray orifice 670 in the "STYLE" spray orifice insert 20 passes the spray opening 47 in the button 41. The sharp edge formed by beveled surface 48 about the periphery of the spray opening 47 doctors any liquid product residue from the hole 670 and the face of the narrow spray orifice insert 20 to help prevent a build up of product residue which can clog the spray orifice in the spray orifice insert 20.

Counter-clockwise rotation of the thumb wheel 43 continues through the detent 74 at the midway position until the second trigger 70 located opposite spray orifice insert 30 strikes the clicker 56, thereby producing another audible click. Immediately afterward, the opposed followers 803 on the uppermost collar 520 of the closure 90 strike the corresponding rotational stops 805 on each of the opposed vertical stops 802, and rotation of the thumb wheel 43 stops. In this position the wide spray orifice insert 30 is concentrically aligned within the spray opening 47 in the push button 41 and the arrow (not shown) on the button wall 51 points to the word "FINISH" on the thumb wheel 43. In this position the discharge passageway 198 in pump stem 186 is in fluid communication with the small hole 770 comprising the spray orifice in the wide spray orifice insert 30.

As should be apparent from the cross-sections of FIGS. 2 and 3, all of the non-used passageways leading to the "STYLE" spray orifice insert 20 are sealed by the outermost surface of the wall of the push button's stem 360. In addition, the small hole 670 comprising the spray orifice in the narrow spray orifice insert 20 is sealed against the inside surface of the push button's outer wall 51 by virtue of the raised face on the spray orifice insert 20. These seals prevent residual liquid product from drying and clogging either the small hole 670 comprising the spray orifice in the narrow spray orifice insert 20 or the non-used passageways leading thereto when spray orifice insert 20 is not in use.

Once orifice insert 30 is aligned with spray opening 47 in push button 41, if the thumb wheel 43 is rotated clockwise, in the direction of arrow 1110 in FIG. 3, toward the "locked" position of the pump anywhere between the two dispensing positions, the trigger 70 opposite the wide spray orifice 30 strikes the clicker 56 on button 41 and produces an audible click. The sharp edge produced by beveled surface 48 on the spray opening 47 in push button 41 doctors any liquid product residue from the hole 770 comprising the spray orifice in the face of the wide spray orifice insert 30. If clockwise rotation of the thumb wheel 43 continues, the detent comprising groove 74 on turret 42 and the rib 80 on push button 41 will engage one another. In this position the apertures 670 and 770 comprising the spray orifices in spray orifice inserts 20 and 30, respectively, are both sealed against the inside surface of the button's outer wall 51 to provide a leak free package. In addition, the internal passageways leading to both spray orifice inserts 20 and 30 are sealed by the outermost surface of the wall of the button's stem 360. The seals thus established help to prevent residual liquid product from drying and clogging either the spray orifice inserts or the internal passageways leading thereto when the pump is not in use. In addition, because neither pair of opposed vertical stops 801,802 inside the thumb wheel portion of the turret 42 are aligned with the opposed followers 803 on the uppermost collar 520 on closure 90, inadvertent actuation of the pump 50 is prevented. This position of turret 42 represents the preferred shipping or travelling condition for the package 10.

PRIMING THE PUMP

Liquid product (not shown) is placed in the wide mouth plastic bottle 60 and the closure 90, with the pump 50, turret 42, including spray orifice inserts 20 and 30, and push button 41 fully assembled thereon, is screwed onto the bottle. The thumb wheel 43 is rotated clockwise to the narrow spray position shown in FIGS. 1 and 2 and designated as the "STYLE" position in FIG. 3.

At this point air is in the pump chamber 180 and the pump 50 must be primed, i.e. air must be removed from the pump chamber. As the push button 41 is depressed, the lowermost end of the sealing conduit 190 seals against the supply conduit 120 in the pump body 148. The friction created by this seal moves the sealing conduit 190 and the poppet 150 closer toward one another due to the lost motion arrangement described earlier herein, so that the uppermost surface 218 of the sealing conduit 190 seals against lowermost valve member surface 280 of the poppet 150. The pump chamber 180 is now sealed, and air in the pump chamber 180 is compressed as the piston 182 moves downward. For the "STYLE" spray pattern described for the exemplary package embodiment 10, the piston 182, stops after a downward travel amounting to only about 25 per cent of the maximum stroke which would be available for the "FINISH" spray pattern due to the lower vertical position of the pair of opposed vertical stops 801 relative to the pair of opposed vertical stops 802.

As finger pressure on the push button 41 is released, the piston 182 reverses direction. The lowermost end of the sealing conduit 190 remains sealed against the supply conduit 120 in the pump body 148. However, due to internal friction between the pump components and the lost motion arrangement, the seal between the uppermost end 218 of the sealing conduit 190 and the lowermost valve member surface 280 of the poppet 150 is broken. This allows the compressed air to escape from the pump chamber 180 into the dip tube 130 and out into the liquid filled bottle 60 where it accumulates in the headspace. As the piston 182 rises, a vacuum is created in the pump chamber 180. Liquid product rises in the dip tube 130 and enters the pump chamber 180 through the space between the uppermost surface 218 of the sealing conduit 190 and the lowermost valve member surface 280 of the poppet 180. In this way air can be forced from the pump chamber 180 and the pump 50 can be primed even when the package is in its short stroke "STYLE" spray pattern position. As will be appreciated, it is this operational characteristic of the disclosed pump 50 which permits priming of the pump even when the user does not fully depress push button 41 to its maximum extent, regardless of which spray pattern the user has selected.

Once the pump chamber 180 is substantially filled with liquid product, downward motion of the piston 182 via depression of push button 41 creates very high pressures in the pump chamber 180 because the liquid product, unlike air, is virtually incompressible. Increasing pressure in the pump chamber 180 and thus the force on one side of the popper 150 eventually overcomes the force of the spring 240 against the popper 150, and the popper 150 quickly moves downward away from the seal formed between the primary valve means 162 on popper 150 and the discharge passageway 198 inside the pump stem 186. This allows high pressure liquid to rush through the discharge passageway 198 in pump stem 186 to the interior passageways 640, 630, 650 and 660 which communicate in sealed relationship with the small hole 670 comprising the spray orifice in narrow spray orifice insert 20, from whence the liquid product is discharged in an atomized "STYLE" spray pattern.

When the thumb wheel 43 is turned to the "FINISH" spray pattern, the action of the pump 50 is substantially the same even though the maximum available pump stroke is greater due to rotational alignment of the opposed followers 803 on collar 520 of closure 90 with the pair of opposed vertical stops 802 on turret 42.

ALTERNATIVE EMBODIMENTS

As pointed out earlier herein, the pump 50 disclosed in conjunction with package embodiment 10 of FIGS. 1-9 is particularly preferred because it is self priming in both spray positions. However the self priming feature in both spray positions is not critical to the practice of the broad aspects of the present invention. If desired, other pumps known in the art may readily be adapted for use in packages of the present invention. Exemplary of such prior art pumps are those disclosed in U.S. Pat. No. 4,025,046 issued to Boris in May, 1977; U.S. Re. Pat. No. 28,366 issued to Pechstein in Mar. 1975; U.S. Pat. No. 4,530,449 issued to Nozawa et at. in July 1985; and U.S. Pat. No. 4,516,727 issued to Saito et al. in May, 1985, all of the aforementioned Patents being hereby incorporated herein.

As has also been pointed out earlier herein, a push button including a rotary turret of the type generally disclosed in FIGS. 1, 2 and 3 as a spray orifice selector means represents a particularly preferred embodiment of a liquid dispensing package of the present invention. However, the present invention is by no means limited to such an embodiment. FIGS. 10-14 disclose an alternative push button system including yet another means for selecting between at least two alternative spray orifice inserts 20 and 30.

The push button embodiment 1041 shown in simplified form in FIGS. 10-14 includes a pivotally mounted hemispherical orifice selector means 1043. The axis of rotation for the hemispherical orifice selector means 1043 is perpendicular to Section Line B—B in FIG. 10. Attached to one end of the axis of rotation of the orifice selector means 1043 is an externally mounted movable arm 1801. In the position shown in FIG. 10, the lowermost end of arm 1801 will make contact with a fixed stop 1803 which is mounted in a substantially stationary position on either the closure or the container with which the push button 1041 is associated. When the push button 1041 is depressed by the user, the lowermost end of arm 1801 contacts the fixed stop 1803, thereby preventing further depression of the push button.

However, when the orifice selector means is tilted to the position shown in FIG. 11 to expose wide spray orifice insert 30, the arm 1801 is automatically repositioned so that it will not make any contact with fixed stop 1803 even when the push button 1041 is fully depressed. Thus, the maximum available stroke of the liquid pump can be achieved without any stroke limiting interference whenever the spray orifice selector means is in the position shown in FIG. 11.

As can be observed from the perspective views of FIGS. 10 and 11 and the cross-sectional views of FIGS. 12–14, the opposed recessed cutouts 1049 in the wall 1051 of the push button 1041 provide a resting place for the user's index finger when the push button 1041 is to be depressed. The recessed cutouts 1049 minimize the tendency to reclose the orifice which has been selected by the user during the liquid spray discharge cycle, since the applied forces will tend to keep whichever orifice is initially exposed in an exposed condition throughout the pump stroking cycle.

As can be seen in the cross-sections of FIGS. 12–14, liquid from the pump to which the push button is ultimately attached can be placed in fluid communication with either spray orifice insert 20 or spray orifice insert 30 by passageway 1640 in push button 1041 and a combination of passageways 1650, 1660, 1670 and 1680 in orifice selector means 1043. Button 1690 is preferably secured in place after molding of spray orifice selector means 1043, including passageways 1650, 1660, 1670 and 1680, to facilitate the easiest possible molding operation and to prevent liquid leakage at the juncture of passageways 1650, 1660, 1670 and 1680 in use.

As with the push button 41 shown in FIGS. 1, 2 and 3, push button 1041 and spray orifice selector means 1043 can also be placed in a position which ensures sealing of the spray orifice inserts 20 and 30 as well as the other internal liquid passageways either prior to placing the package in service or when the user is travelling. This condition is illustrated in FIG. 12.

As will be appreciated by those skilled in the art, the hemispherically shaped orifice selector means 1043, the complementary recess formed in the uppermost end of push button 1041, and the sharp edges on the opposed recessed cutouts also provide orifice wiping benefits to remove residual liquid product when the orifice selector means 1043 is rotated from the position shown in FIG. 13 to the position shown in FIG. 14, and vice versa.

Still other combinations of push buttons and spray orifice selector means within the scope of the present invention can readily be envisioned. For example, in the simplified exploded schematic illustration of FIG. 15, a pair of spray orifice inserts 20,30 are located approximately 90° apart from one another about the periphery of an interior vertically movable, but non-rotatable member 2042 which is in fluid communication with the stem of the liquid pump (not shown). The spray orifice inserts 20,30 are also positioned at different vertical locations on the interior member 2042.

A concentric outermost push button member 2041 having a single spray orifice opening 2047 could be mounted over said non-rotatable interior member 2042 employing means for aligning the opening in the push button with either of the orifices on the interior member. For example, the push button 2041 could employ means, such as an integrally molded internal follower 2062 which snaps into a recessed groove 2065 on interior member 2042. If the groove 2065 comprises a pair of opposed horizontal segments 2066 and 2067 connected to one another by a helically shaped segment 2068, rotation of the push button 2041 approximately 90° will cause the spray opening 2047 to realign from one orifice insert to the other.

In such an instance, the stroke of the pump could be limited by causing interference to occur between the lowermost end 2048 of the push button and a stationary portion of the package, such as the uppermost surface of closure 2090, when the opening 2047 in the push button 2041 is aligned with the lowermost orifice insert 20. A lesser degree of interference or no interference at all could exist when the opening 2047 in the push button 2041 is aligned with the uppermost orifice insert 30.

Figure 15:
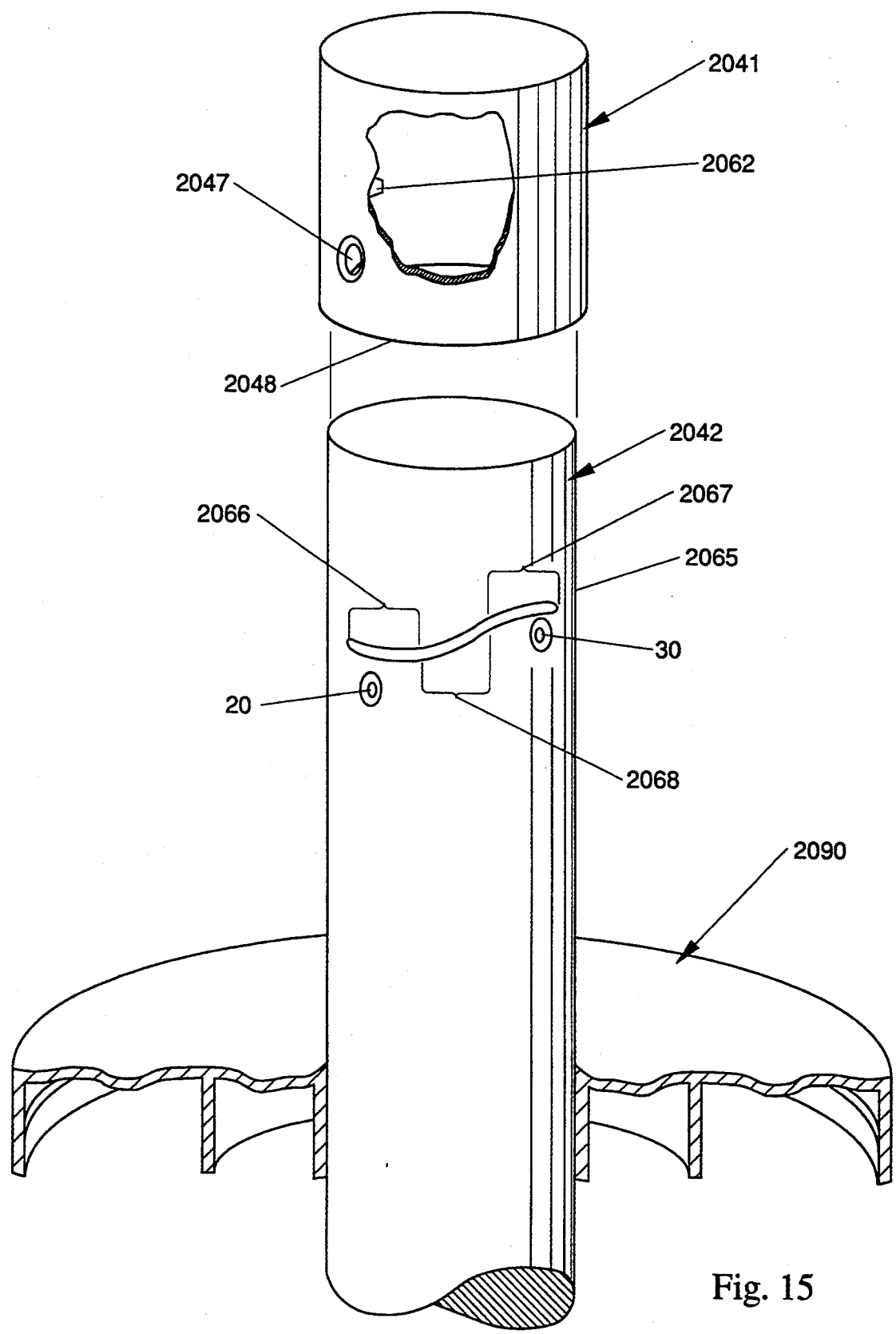
FIG. 15 is a simplified, partially segmented, exploded perspective view of an alternative push button and orifice selector means for use in packages of the present invention.

Still another push button and spray orifice selector means of the present invention could employ two or more vertically aligned orifices on an interior member such as that generally shown in FIG. 15. A vertical recessed groove and follower generally similar to those shown in FIG. 15 could be employed opposite the spray opening in the push button to ensure rotational alignment of the spray opening in the push button with all of the vertically aligned orifice inserts. If desired, a gripping means, such as a spring loaded clip, could be secured to the push button for securing it at predetermined vertical locations which would permit alignment of the spray opening in the push button with whatever orifice insert is selected by the user. As with the embodiment of FIG. 15, interference between the push button skirt and the uppermost surface of the closure would effectively limit the stroke of the pump.

While particularly preferred embodiments of the present invention have been described in the context of a hair spray product, the present invention is by no means limited to such product applications. Other exemplary product applications where spray pumps having multiple orifices exhibiting different spray patterns or characteristics and predetermined optimized product dosages automatically associated with each orifice include sunscreens, perfumes, fragrances, medicaments, spray starches, and the like.

Furthermore, while particular package embodiments of the present invention have been illustrated and described, it would be obvious to those skilled in the art that various changes and modifications can be made without departing form the spirit and scope of the present invention. It is intended to cover in the appended claims, all such modifications that are within the scope of this invention.

What is claimed is:

1. A spray orifice selector system for a spray package having at least two spray orifices, each of said orifices being manually selected by the user of said package, said selector system comprising:
   a) a spray orifice selector movably secured to a container for housing a liquid, said selector providing fluid communication between said container and a first spray orifice when said selector is moved to align said first spray orifice with said container, and between said container and a second spray orifice when said spray orifice selector is moved to align said second spray orifice with said container, said spray orifice selector exposing for spraying only one of said first and second spray orifices at a time; and
   b) means for moving said selector such that said user may grip said container in a first hand and operate said spray orifice selector with a second hand without having to regrip said container with said first hand in order to spray said liquid in a fixed direction from said first and said second spray orifices.

2. A spray orifice selector system for a spray package having at least two spray orifices, each of said orifices being manually selected by the user of said package, said selector system comprising:

a) a spray orifice selector turret rotatably secured to a container for housing a liquid, said selector turret providing fluid communication between said container and a first spray orifice when said selector turret is rotated to align said first spray orifice with said container, and between said container and a second spray orifice when said spray orifice selector turret is rotated to align said second spray orifice with said container, said spray orifice selector turret exposing for spraying only one said first and second spray orifices at a time;

b) a thumb wheel for moving said selector between said first spray orifice and said second spray orifice such that said user may grip said container in a first hand and operate said spray orifice selector with a second hand without having to regrip said container with said first hand in order to spray said liquid in a fixed direction from said first and said second spray orifices;

c) a spray actuator button connected to said container internally concentric to said thumb wheel for moving said selector, said button being rotationally fixed relative to said container; and d) a position located between said first and said second spray orifices which closes said first and said second spray orifices to fluid communication with said container in order to prevent spraying, said spray orifice selector being detented when said first spray orifice is aligned with said container for spraying, when said second spray orifice is aligned with said container for spraying, and when said position between said first and said second spray orifices is aligned with said container to prevent spraying.

3. A spray orifice selector system for a spray package having at least two spray orifices, each of which can be manually selected by the user of the package, said selector system comprising:

a) a push button having a stem in fluid communication with a container for housing a liquid, said stem having a radial passageway, said push button being connected to said container such that said radial passageway is rotationally fixed relative to said container;

b) a turret having an externally concentric thumbwheel, said turret and said thumbwheel being rotatably secured to said stem, said turret having a first spray orifice and a second spray orifice, said turret being slidably engaged with said stem so that when said thumbwheel is rotated to a first position, said first spray orifice is aligned with said radial passageway of said stem for discharging said liquid, and when said thumbwheel is rotated to a second position, said second spray orifice is aligned with said radial passageway of said stem for discharging said liquid, said push button when depressed actuates a spray pump located between said stem and said container to provide pressure to discharge said liquid from said container through said stem and radial passageway, said pump sprayer being self priming regardless of which of said at least two spray orifices is positioned for spraying; and c) a position located between said first and said second spray orifices which closes said first and said second spray orifices to fluid communication with said container in order to prevent spraying, said spray orifice selector being detented when said first spray orifice is aligned with said container for spraying, when said second spray orifice is aligned with said container for spraying, and when said position between said first and said second spray orifices is aligned with said container to prevent spraying.

* * * * *